(No Model.)

J. C. MELOON.
FIRE ALARM.

No. 249,197. Patented Nov. 8, 1881.

WITNESSES:
J. A. Miller Jr
Wm L. Cox

INVENTOR:
Jonathan C. Meloon
by Joseph A. Miller Atty

UNITED STATES PATENT OFFICE.

JONATHAN C. MELOON, OF PROVIDENCE, RHODE ISLAND, ASSIGNOR TO THE PROVIDENCE STEAM AND GAS PIPE COMPANY, OF SAME PLACE.

FIRE-ALARM.

SPECIFICATION forming part of Letters Patent No. 249,197, dated November 8, 1881.

Application filed March 9, 1881. (No model.)

*To all whom it may concern:*

Be it known that I, JONATHAN C. MELOON, of the city and county of Providence, and State of Rhode Island, have invented an Improvement in Alarms for Automatic Fire-Extinguishers; and I hereby declare that the following is a full, clear, and exact description of the same, reference being had to the accompanying drawings, forming part of this specification.

This invention has reference to an improvement in devices for giving an alarm when, in a system of pipes provided with distributers constructed to open automatically by the action of the fire, one or more of such distributers are opened.

The invention consists in the peculiar arrangement, in connection with a valve controlling the water-supply, of a chamber and diaphragm constructed to operate the alarm, and a valve operated by the main valve so that a slight movement of the main valve will open the auxiliary valve and release the pressure; whereas, the opening of the main valve will also open the auxiliary valve and supply the chamber with water under pressure, so as to raise the diaphragm and operate the alarm.

Figure 1:
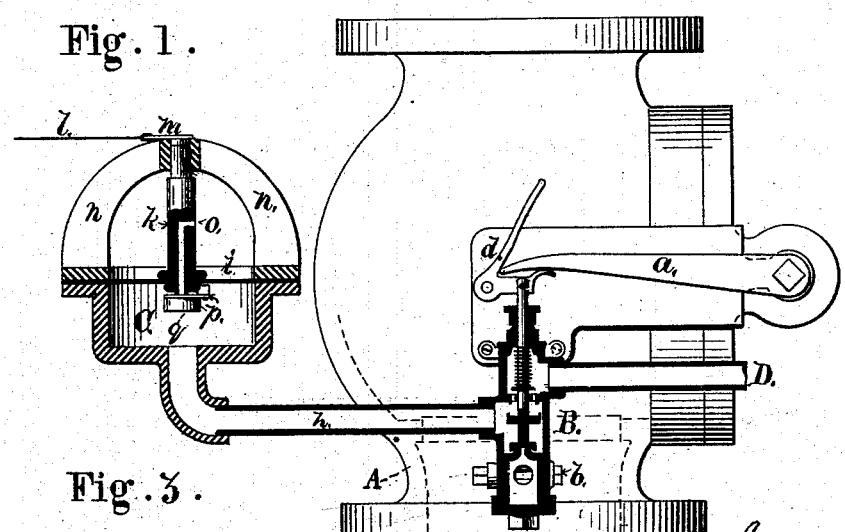
Figure 3:
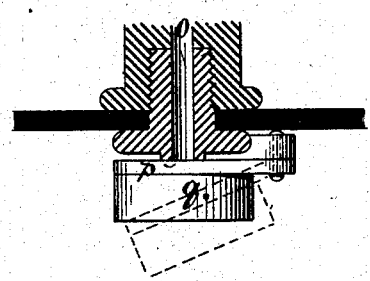
Figure 2:
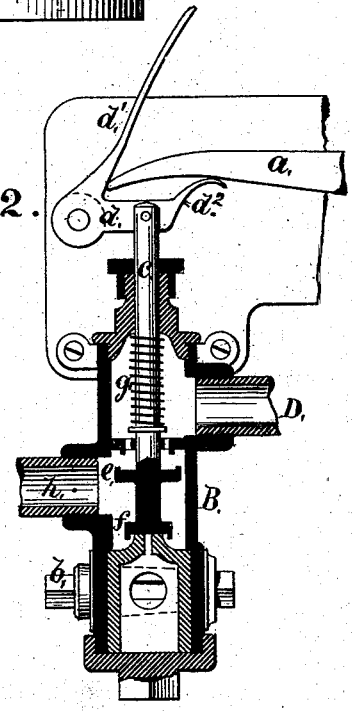

Figure 1 is a view of the main-valve casing, the auxiliary valve operated by the main valve, and the diaphragm for operating the alarm, shown in section. Fig. 2 is a sectional view of the auxiliary valve, shown enlarged. Fig. 3 is an enlarged sectional view of the diaphragm, showing the air-vent.

In the drawings, A is the valve-casing of the main valve controlling the water-supply, the valve shown in broken lines. This main valve is provided with a valve-stem, from which an arm extends to a rock-shaft passing through a stuffing-box, and provided on the outside of the valve-case with the arm $a$. This arm $a$ will therefore move with every motion of the main valve.

B is an auxiliary valve, connected with the valve-casing A below the main valve by a pipe having the cock $b$, so that the connection can be shut off. C is a chamber provided with a diaphragm and means for operating an alarm when the diaphragm is raised. D is a waste-pipe.

In the valve B, referring to Fig. 2, $c$ is the valve-stem, connected by a hinged connection with the double trip-lever $d$, having the arms $d'$ and $d^2$. The valve-stem $c$ is provided with the double-beat valve $e$, $f\!f$ controlling the water-inlet, and $e$ the water-outlet, the coiled spring $g$ holding the valve $f$ to its seat when in the normal condition. The valve B is connected with the chamber C by the pipe $h$, and the chamber is covered by the diaphragm $i$, to the center of which the piston or rod K is secured, the upper end of which passes through the stirrup $n$.

$l$ is a wire, rod, cord, or other device connected with an alarm; and $m$ is a ring, hook, button, or other device, which is disengaged when the diaphragm raises the piston K, and operates an alarm.

To allow the air to escape from the chamber C when the water enters, and to automatically enter when the water is discharged, the air-vent $o$ is made in the piston K, as shown in Figs. 1 and 3, and the rubber valve $p$ is secured on one end to the piston, as shown in Fig. 3. To the rubber valve $p$ the cork float $q$ is secured, so that when the valve is open, as shown in broken lines in Fig. 3, and water enters the chamber C, the cork $q$ will float and close the air-outlet.

The operation of this improved alarm-operating device is as follows: When from any cause the water-pressure in the main is increased, or the water-pressure in the system of pipes is diminished, the main valve will rise a short distance to allow a small quantity of water to pass by, the arm $a$ will consequently also rise, and, if it is used to operate the alarm, a false alarm will be given. To avoid this the arm $a$ is made to raise the valve $f$ from its seat by coming in contact with the arm $d'$ of the trip-lever $d$. This allows the water from under the main valve to enter the pipe $h$, and even a small quantity of water will release the sudden increase of pressure, so that the main valve will close quickly. When, now, one or more of the distributers are opened by fire, the main valve will be raised by the flow of water to the system, and the arm $a$ will, in swinging upward, raise the valve $f$ off its seat, the water will pass through the pipe $h$ to the chamber C, expel the air through the vent until the float $p$ closes the same, the diaphragm will be raised and will push the disk or button $m$ off its fastening, thus releasing the alarm. As soon as the fire is extinguished the main valve is closed by depressing the arm $a$. When it comes in contact with the trip-lever $d$ the valve $f$ is closed, and the valve $e$, which has been closed, is now opened, the water from the chamber C is discharged through the valve-opening $e$ and the pipe D, and the device is again ready for action.

Having thus described my invention, I claim as new and desire to secure by Letters Patent—

1. The combination, substantially as before set forth, of the main valve, the double-beat auxiliary valve operated thereby, the chamber provided with a diaphragm, the float vent-valve, and the vented piston-rod.

2. The combination, with the arm $a$, of the valve B, a pipe leading therefrom to the diaphragm chamber C, having a discharge-valve, as described, and the discharge-pipe D, constructed to relieve any excess of pressure and operate an alarm, as described.

3. The combination, with the chamber C and diaphragm $i$, of the signal-operating piston K, the air-vent $o$, and valve $p$, constructed to relieve the chamber of air, as described.

4. The combination, with the main valve, of the chamber C, the pipe $h$ leading thereto, discharge D, valve-stem $c$, valve B, trip-lever $d$, and arm $a$, operating said trip-lever, the whole being arranged to admit water to the chamber C and discharge the same, substantially as described.

JONATHAN C. MELOON.

Witnesses:
 JOSEPH A. MILLER,
 J. A. MILLER, Jr.